United States Patent

Kaiho et al.

[11] Patent Number: 6,112,520
[45] Date of Patent: Sep. 5, 2000

[54] EXHAUST GAS PURIFYING SYSTEM FOR INTERNAL COMBUSTION ENGINE

[75] Inventors: Hideo Kaiho; Noriyuki Kishi; Shinichi Kikuchi; Tatsuya Okayama, all of Saitama, Japan

[73] Assignee: Honda Giken Kogyo Kabushiki Kaisha, Tokyo, Japan

[21] Appl. No.: 09/146,139

[22] Filed: Sep. 3, 1998

[30] Foreign Application Priority Data

Sep. 12, 1997 [JP] Japan .................................. 9-267828

[51] Int. Cl.$^7$ ...................................................... F01N 3/10
[52] U.S. Cl. .............................. 60/303; 60/300; 60/299; 60/297; 60/286; 422/177
[58] Field of Search .............................. 60/284, 297, 300, 60/303, 286, 299; 422/174, 177, 170

[56] References Cited

U.S. PATENT DOCUMENTS

| | | | |
|---|---|---|---|
| 5,146,743 | 9/1992 | Maus et al. | 60/274 |
| 5,538,697 | 7/1996 | Abe et al. | 422/171 |
| 5,802,845 | 9/1998 | Abe et al. | 60/274 |
| 5,887,422 | 3/1999 | Abe et al. | 60/274 |
| 5,941,068 | 8/1999 | Brown et al. | 60/297 |

FOREIGN PATENT DOCUMENTS

| | | |
|---|---|---|
| 5-10117 | 1/1993 | Japan . |
| 5-31359 | 2/1993 | Japan . |
| 9-192453 | 7/1997 | Japan . |

*Primary Examiner*—Thomas Denion
*Assistant Examiner*—Binh Tran
*Attorney, Agent, or Firm*—Arent Fox Kintner Plotkin & Kahn, PLLC

[57] ABSTRACT

In an exhaust system of the internal combustion engine, there are provided, in this order from upstream, a three-way catalyst, an adsorbent-catalyst containing at least zeolite in its composition and capable of absorbing hydrocarbons, an electrically heated catalyst containing at least platinum in its composition, and a catalyst containing at least palladium in its composition. The electrically heated catalyst can effectively purify low boiling-point HC of paraffinic hydrocarbon which has been desorbed from the adsorbent-catalyst after about 20 seconds from the start of the engine. On the other hand, the catalyst can effectively purify high boiling-point HC of aromatic hydrocarbon which has been desorbed from the adsorbent-catalyst after about 80 seconds from the start of the engine. When the catalyst is an electrically heated catalyst, it is energized after the energization of the other electrically heated catalyst is ended and the supply of electric power can hence be minimized.

12 Claims, 4 Drawing Sheets

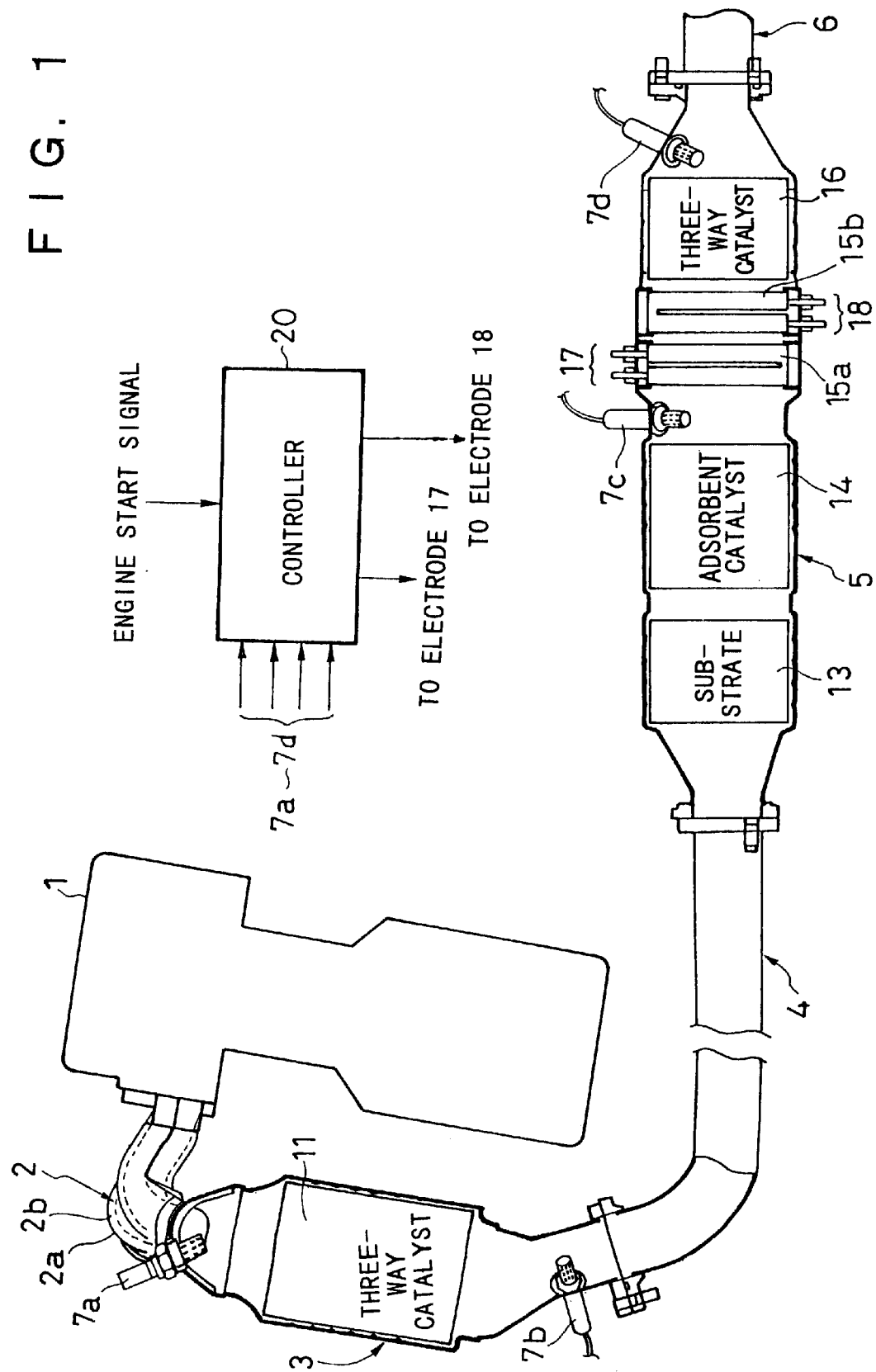

F I G. 5
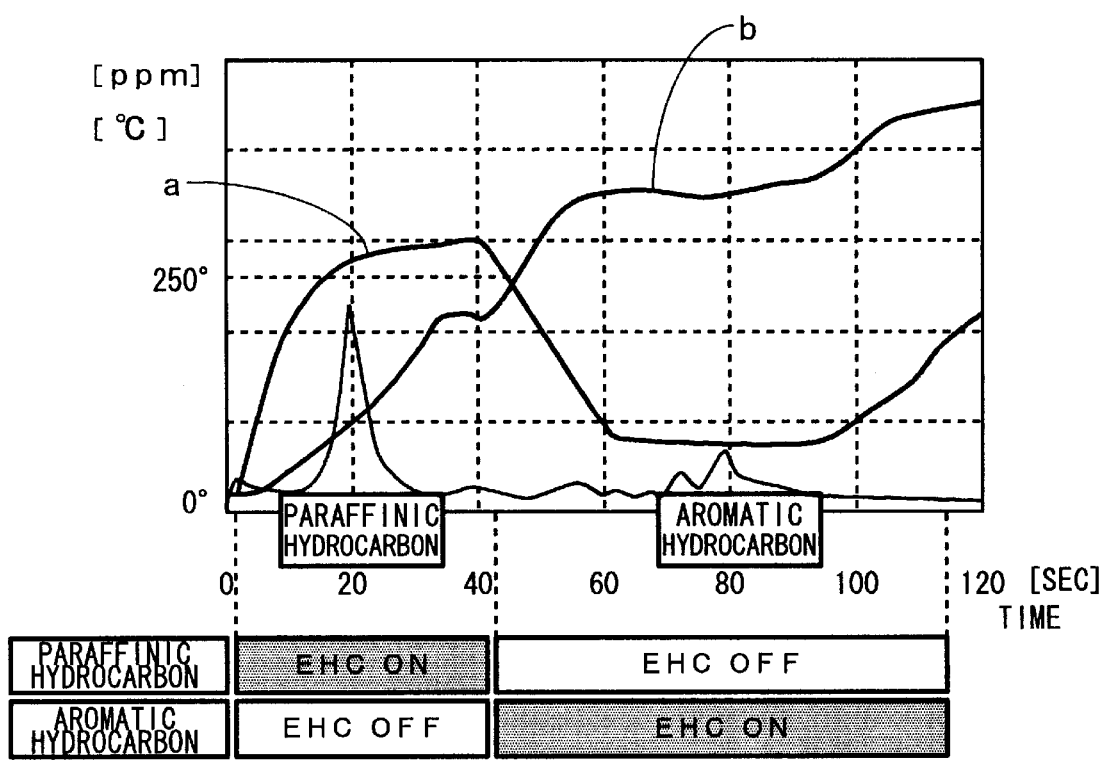

EXHAUST GAS PURIFYING SYSTEM FOR INTERNAL COMBUSTION ENGINE

BACKGROUND OF THE INVENTION

1. Field of the Invention

The present invention relates an exhaust gas purifying system for an internal combustion engine and particularly, to an exhaust gas purifying system for an internal combustion engine, which can purify hydrocarbons (referred to as HC hereinafter) with a lower electric power.

2. Description of the Related Art

A variety of studies for purifying exhaust gases from an internal combustion engine e.g. of an automotive vehicle have been developed to prevent pollution of the atmosphere. Known harmful substances in the exhaust gas from the vehicle are HC, CO, and NOx. For example, one of schemes for purifying HC is disclosed in Japanese Patent Laid-open Publication Hei 5-10117.

As depicted in the Publication, the scheme incorporates a combination of a catalyst converter with a heater function and a catalyst converter with no heater function in order to minimize the emission at the start of the engine. According to the scheme, the catalyst converter with the heater function quickly heats up a catalyst to a temperature of activation level. Hence, the emission at the start of the engine will be minimized.

Another scheme is disclosed in Japanese Patent Laid-open Publication Hei 5-31359. The scheme has a zeolite adsorbent, a honeycomb heater, and a main monolithic catalyst provided in an exhaust gas passage of an automotive vehicle so that HC in the exhaust gas of a lower temperature at the start of an engine is adsorbed by the adsorbing action of the zeolite adsorbent and further purified through energizing the honeycomb heater to instantaneously activate the catalyst on the heater.

However, quickly heating up the catalyst with the heater requires a large amount of electric power in a short time. This allows a limited volume of the catalyst to be heated up. Since the exhaust gas purifying system is designed for the internal combustion engine of an automotive vehicle, its power consumption depends on a particular source such as a battery or an alternator. Accordingly, the higher power consumption demands a more supply of electric power from the source and will cause the source to be increased in the capacity.

The scheme also has not proposed to purify according to type of HC desorbed from the adsorbent-catalyst.

SUMMARY OF THE INVENTION

It is an object of the present invention to provide an exhaust gas purifying system for an internal combustion engine in which the catalyst is activated by a moderate supply of electric power available in an automotive vehicle without consumption of a large amount of electricity in a short time thus improving the purification of HC at the start of the engine.

For achievement of the object of the present invention, an exhaust gas purifying system for an internal combustion engine having a three-way catalyst and an adsorbent-catalyst which contains at least zeolite in its composition and is capable of adsorbing hydrocarbons arranged in this order from upstream in an exhaust gas passage of the internal combustion engine is provided comprising: a first electrically heated catalyst containing at least platinum in its composition and disposed at the downstream of the adsorbent-catalyst; and a catalyst containing at least palladium in its composition and disposed at the downstream of the first electrically heated catalyst. As featured, hydrocarbons of paraffinic hydrocarbon first desorbed from the adsorbent-catalyst are purified by the first electrically heated catalyst which contains platinum in its composition favorable for purifying paraffinic hydrocarbons and is activated at an early stage of the operation, thus decreasing the overall emission. Also, hydrocarbons of aromatic hydrocarbon succeedingly desorbed from the adsorbent-catalyst are purified by the catalyst which contains palladium in its composition favorable for purifying aromatic hydrocarbons and is thus activated at delayed timing by heat emitted from the first electrically heated catalyst as well as heat of the exhaust gas, thus decreasing the overall emission.

In addition, the catalyst may be an electrically heated catalyst. In this case, the catalyst can satisfactorily be activated during the period before the desorption of aromatic hydrocarbons from the adsorbent-catalyst is started. Since the period before the desorption of aromatic hydrocarbons from the adsorbent-catalyst is started is inserted, the electrically heated catalyst requires not a large amount of electricity (current) but can be activated by a moderate power supply commonly available in any automotive vehicle.

BRIEF DESCRIPTION OF THE DRAWINGS

FIG. 1 is a schematic view showing the arrangement of an embodiment of the present invention;

FIG. 5 is a diagram showing the relation between the process of controlling currents to two electrically heated catalysts and the temperature of the electrically heated catalysts.

DETAILED DESCRIPTION OF THE PREFERRED EMBODIMENTS

Figure 2A:
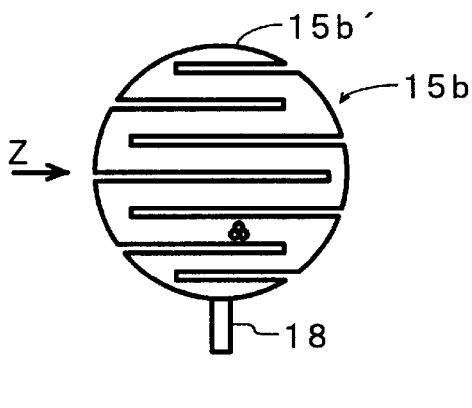
FIGS. 2A and 2B are a front and a side view of a substrate of electrically heated catalyst.

The present invention will be described in more detail referring to the accompanying drawings. FIG. 1 is a schematic view of an exhaust gas purifying system for an internal combustion engine showing one embodiment of the present invention.

As shown, a series of an exhaust manifold 2, a first converter case 3, a first exhaust tube 4, a second converter case 5, and a second exhaust tube 6 are connected in the form of an exhaust gas passage on the exhaust side of an engine 1. Also, a plurality of air/fuel ratio sensors 7a to 7d, e.g. oxygen sensors, are disposed at given location of the exhaust gas passage. The air/fuel ratio sensors 7a may preferably be of a liner air fuel ratio sensor.

A three-way catalyst (TWC) 11 is mounted in the center of the first converter case 3 located at the downstream of the exhaust manifold 2. In this embodiment, the three-way catalyst 11 has about 1200 cells per square inch in cross section. The second converter case 5 contains, from upstream, a substrate 13, an adsorbent-catalyst 14, electrically heated catalysts 15a and 15b, and a three-way catalyst 16. The energization of the electrically heated catalysts 15a and 15b are controlled by a controller 20. In practice, the controller 20 in addition to the energization of the electrically heated catalysts 15a and 15b controls the action of another component such as fuel injection, which will not be explained.

The exhaust manifold 2 which was once made of cast iron is fabricated in the embodiment by pressing a 0.5 mm thick stainless steel to a shape which is thus lower in the heat capacity than conventional one. The exhaust manifold 2 is coated with an exhaust manifold case 2a which is made by pressing a 1.5 mm thick stainless steel so that an air layer 2b is provided between the exhaust manifold 2 and the exhaust manifold case 2a forming a thermal insulating structure and is thus minimized in the radiation of heat. Accordingly, since the heat capacity and the heat radiation of the exhaust manifold 2 are minimized, the conduction of heat to the three-way catalyst 11 will be improved thus accelerating the activation of the three-way catalyst 11.

The substrate 13 is made of a honeycomb structure of a ceramic material or preferably of a metallic material which is higher in the absorption of heat. The metallic structure of the substrate 13 may be implemented by rolling a plain sheet and a corrugate sheet of highly heat-resistant ferrite stainless steel a number of times. In the embodiment, the metal substrate 13 incorporates a honeycomb structure having about 300 cells per square inch in cross section. To prevent increase of the exhaust resistance, the honeycomb structure is profiled relatively coarse as a role in the exhaust system.

The adsorbent-catalyst 14 has a structure having an HC adsorbent such as zeolite, e.g. ZSM-5, or layers of HC adsorbent and three-way catalyst provided on a honeycomb substrate. The honeycomb substrate of the adsorbent-catalyst 14 has about 1200 cells per square inch in cross section. As understood, the adsorbent-catalyst 14 can adsorb HC before the temperature reaches a particular degree and when heated up over the degree, it will desorb the adsorbed HC.

Figure 2B:
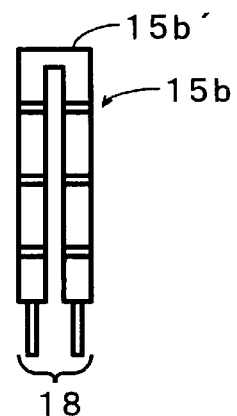

The electrically heated catalysts 15a and 15b are identical in the shape. It may be a honeycomb heater coated with the catalyst such as disclosed in Japanese Patent Laid-open Publication Hei 9-192453. For example, the honeycomb heater of the electrically heated catalyst 15b has a shape shown in FIG. 2. FIG. 2A is a front view and FIG. 2B is a side view seen from the z direction of FIG. 2A. As shown, the honeycomb heater comprises two thin substrates having a round shape and joined to each other at one end 15b'. The thin substrate has a plurality of slits provided therein in alternate relationship. Electrodes 18 are connected to both far ends of the honeycomb heater for supply of electric power. The electrodes 18 receive currents from a battery not shown. Similarly, the electrically heated catalyst 15a is equipped with electrodes 17 for supply of electric power.

When the engine 1 is started, an exhaust gas including HC runs through the exhaust manifold 2, the first converter case 3, the first exhaust tube 4, the second converter case 5, and the second exhaust tube 6 in the exhaust gas purifying system for internal combustion engine. The exhaust gas is first low in the temperature and the catalyst located in the exhaust gas passage remains below a level of activation and performs absorption of heat. Since the exhaust gas entering the adsorbent-catalyst 14 has a low temperature, it adsorbs HC. When the temperature of the exhaust gas rises with time, the catalysts in the exhaust gas passage are heated up. The higher the temperature of the adsorbent-catalyst 14, the faster the desorption of HC is promoted. When the desorbing speed exceeds the adsorbing speed (i.e. 20 seconds after the start of the engine 1), HC is desorbed from the adsorbent.

Figure 3:
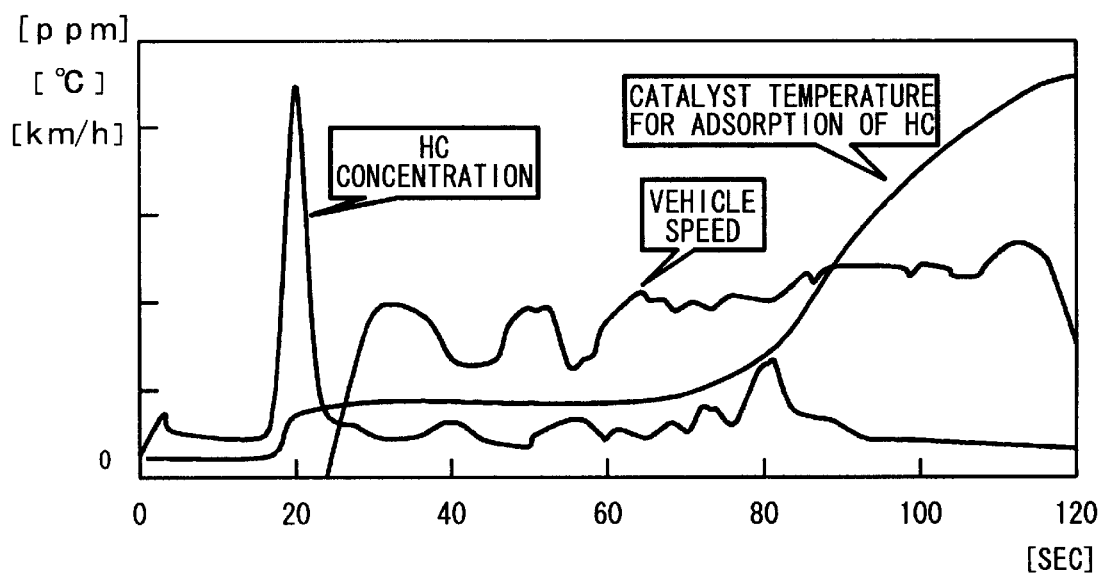
FIG. 3 is a diagram showing the relation between the HC concentration at the start of an engine, the vehicle running speed, and the catalyst temperature for adsorption of HC.
Figure 4:
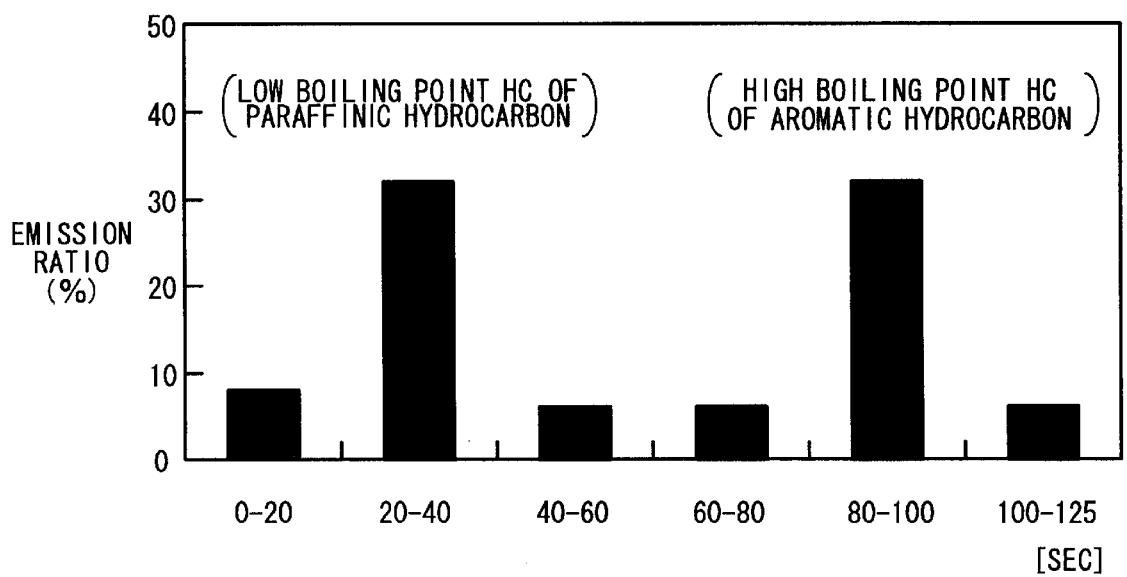
FIG. 4 is a bar-graph diagram showing an emission of HC with time, assuming that the emission of HC is 100 in a duration from 0 to 125 seconds after the start of the engine.

FIG. 3 illustrates the relation between the HC concentration at the start of the engine, the vehicle speed, and the catalyst temperature for adsorption of HC, where the horizontal axis represents time and the vertical axis represents measurements in ppm, km/h, and °C. As apparent, the HC concentration in the exhaust gas at the start of the engine or the amount of HC desorbed from the HC adsorbent exhibits a first peak after 20 seconds from the start of the engine and a second peak after about 80 seconds. FIG. 4 is a bar-graph diagram showing the amount of HC with time, assuming that the total amount of HC generated during a period of 0 to 125 seconds after the start of the engine is 100. As shown, the amount of HC has first peak in a period of 20 to 40 seconds and second peak in a period of 80 to 100 seconds after the start of the engine. It was found by analyzing the HC gas in the duration that a low boiling point HC of paraffinic hydrocarbon is generated in the period of 20 to 40 seconds while a high boiling point HC of aromatic hydrocarbon is generated in the period of 80 to 100 seconds.

Figure 6:
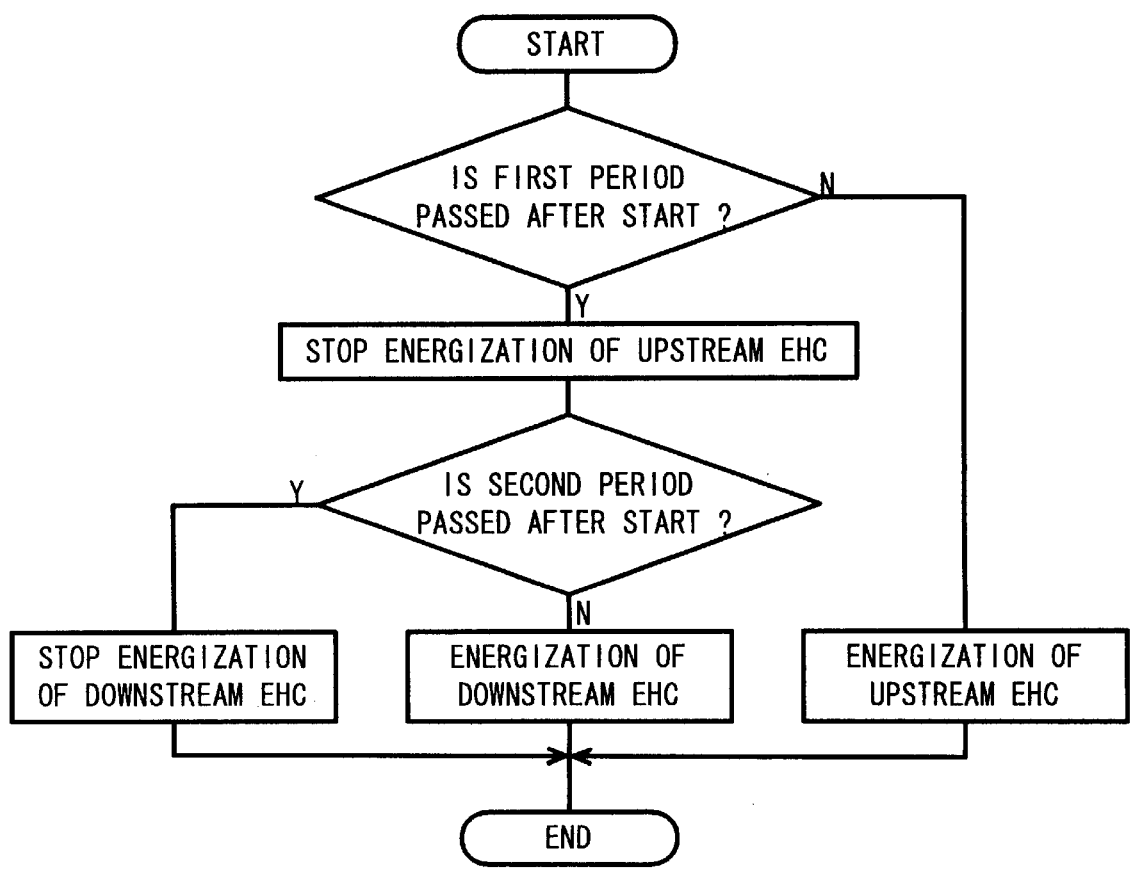
FIG. 6 is a flowchart showing an action of a controller illustrated in FIG. 1.

In the embodiment, the electrically heated catalyst 15a is a paraffin purifying catalyst containing at least platinum and the electrically heated catalyst 15b is an aromatic purifying catalyst containing at least palladium. The energization of the electrically heated catalysts 15a and 15b is controlled by the controller 20 as shown in FIGS. 5 and 6. More particularly, the electrically heated catalyst 15a located at the upstream side is energized for a predetermined first period (e.g. 0 to about 40 seconds) after the start of the engine and when the first period has elapsed, the electrically heated catalyst 15a is deenergized and then the electrically heated catalyst 15b located at the downstream side is energized. The energization of the electrically heated catalyst 15b continues for a predetermined second period (e.g. about 40 to 110 seconds) before the electrically heated catalyst 15b is disconnected.

As the result, the paraffin purifying catalyst is heated up to substantially 250°C. within about 20 seconds and activated as denoted by the curve a of FIG. 5. The low boiling point HC of paraffinic hydrocarbon will thus be purified effectively. The aromatic purifying catalyst while being not energized and heated in the period of 0 to 40 seconds absorbs heat from the exhaust gas. After 40 seconds, the temperature of the aromatic purifying catalyst increases to substantially a level of activation as denoted by the curve b of FIG. 5. As soon as the aromatic purifying catalyst is energized after 40 seconds, its temperature rises up to 250° C. within a short period and its activation starts. This allows the high boiling point HC of aromatic hydrocarbon desorbed at a moment after 80 seconds to be effectively purified. The curve a shown in FIG. 5 denotes the temperature of the paraffin purifying catalyst and the curve b represents the temperature of the aromatic purifying catalyst.

Because it takes 80 seconds before the high boiling point HC of aromatic hydrocarbon is desorbed the temperature of the aromatic purifying catalyst rises without energization. Therefor, the high boiling point HC of aromatic hydrocarbon can be purified by the aromatic purifying catalyst without energization of the aromatic purifying catalyst. Hence, the aromatic purifying catalyst without electric heating is successfully used as the electrically heated catalyst 15b.

In FIG. 6, measurement of the first and second periods may be substituted by using the temperature of the electrically heated catalysts 15a and 15b. Also, the first and second periods or the temperature of the electrically heated catalysts 15a and 15b may be corrected using the temperature of cooling water and the voltage of a battery.

A second embodiment of the present invention will now be described in which the power required for the electrically heated catalysts 15a and 15b is further decreased. In this embodiment, the substrate of the electrically heated catalyst 15a located at the upstream side is decreased in the area for heat conduction to prevent radiation of the heat produced by the electric power while the substrate of the electrically heated catalyst 15b located at the downstream side is increased in the area for heat conduction to receive more heat from the exhaust gas, i.e. thermal energy of the exhaust gas can be utilized efficiently. For example, the substrate of the electrically heated catalyst 15a located at the upstream side has about 500 cells per square inch and the substrate of the electrically heated catalyst 15b located at the downstream side has about 1200 cells per square inch.

A third embodiment of the present invention will be described. In this embodiment, the substrate of the electrically heated catalyst 15a located at the upstream side is supplied with a higher rate of electric power while the substrate of the electrically heated catalyst 15b located at the downstream side is supplied with a lower rate of electric power, so that the electrically heated catalyst 15b at the downstream can be heated by the thermal energy of the exhaust gas elevated by the electrically heated catalyst 15a at the upstream side. Accordingly, the two electrically heated catalysts at the upstream and downstream sides can be heated up separately depending on the type of hydrocarbons to be purified, hence contributing to the low power consumption.

It is preferable for optimum energization in series mode that the substrate of the electrically heated catalyst 15a at the upstream side has a higher resistance while the substrate of the electrically heated catalyst 15b at the downstream side has a lower resistance. On the other hand, it is matched in a parallel mode that the substrate of the electrically heated catalyst 15a at the upstream side has a lower resistance while the substrate of the electrically heated catalyst 15b at the downstream side has a higher resistance.

According to the present invention, the first electrically heated catalyst containing at least platinum and the other catalyst containing at least palladium are disposed in a row toward the downstream of the adsorbent-catalyst. In operation, the hydrocarbons of paraffinic hydrocarbon desorbed first from the adsorbent-catalyst are purified directly by the first electrically heated catalyst which is activated at an early stage of the operation. The hydrocarbons of aromatic hydrocarbon desorbed after the hydrocarbons of paraffinic hydrocarbon are purified by activating with a specific delay of time the other catalyst, which contains palladium that is favorable to purify the hydrocarbons of aromatic hydrocarbon, with heat applied from the exhaust gas and the first electrically heated catalyst. This will improve the purification of HC at the start of the engine.

When the other catalyst is also an electrically heated catalyst, it is heated to a desired temperature with the use of a difference of time until the hydrocarbons of aromatic hydrocarbon is desorbed from the adsorbent-catalyst but not application of a large electric power to the electrically heated catalyst. This allows the catalyst to be definitely activated by a moderate rate of electric power which is available in a common automotive vehicle.

The embodiments of the present invention provide the following advantages.

(1) Because the substrate of the first electrically heated catalyst is coarser in the density of cells and smaller in the area for heat conduction than that of the second electrically heated catalyst, its heat is prevented from dissipating to the exhaust gas and the efficiency of heating will be increased. In opposite, the latter substrate is increased in the area for heat conduction and can thus receive more heat from the exhaust gas improving the use of thermal energy of the exhaust gas.

(2) Because the other catalyst is a three-way catalyst, the purification of hydrocarbons in normal mode can be improved.

(3) Because the first electrically heated catalyst is activated at the time when the desorption of hydrocarbons from the adsorbent-catalyst starts up, hydrocarbons can be purified efficiently.

(4) Because the second electrically heated catalyst is started energizing when the energization of the first electrically heated catalyst has been finished, its activating current can be minimized for energy saving.

(5) Because the supply of electric power to the first electrically heated catalyst is greater than that to the second electrically heated catalyst, both the first and second electrically heated catalysts located at the upstream and downstream can be heated up depending on the type of hydrocarbons to be purified thus contributing the low power operation.

What is claimed is:

1. An exhaust gas purifying system for an internal combustion engine having a three-way catalyst and an adsorbent-catalyst which contains at least zeolite in its composition and is for adsorbing hydrocarbons arranged in this order from upstream in an exhaust gas passage of the internal combustion engine, comprising:

a first electrically heated catalyst containing at least platinum in its composition and disposed at the downstream of the adsorbent-catalyst; and a second electrically heated catalyst containing at least palladium in its composition and disposed at the downstream of the first electrically heated catalyst.

2. An exhaust gas purifying system for an internal combustion engine according to claim 1, wherein the density of cells in a substrate of the first electrically heated catalyst is coarser than the density of cells in a substrate of the second electrically heated catalyst.

3. An exhaust gas purifying system for an internal combustion engine according to claim 2, wherein the second electrically heated catalyst is energized at the time when the energization of the first electrically heated catalyst has been finished.

4. An exhaust gas purifying system for an internal combustion engine according to claim 3, wherein the supply of electric power to the first electrically heated catalyst is greater than the supply of electric power to the second electrically heated catalyst.

5. An exhaust gas purifying system for an internal combustion engine according to claim 1, wherein the adsorbent-catalyst is a three-way catalyst.

6. An exhaust gas purifying system for an internal combustion engine according to claim 1, wherein the first electrically heated catalyst is activated at the time when hydrocarbons are desorbed from the adsorbent-catalyst.

7. An exhaust gas purifying system for an internal combustion engine according to claim 6, wherein the second electrically heated catalyst is energized at the time when the energization of the first electrically heated catalyst has been finished.

8. An exhaust gas purifying system for an internal combustion engine according to claim 7, wherein the supply of electric power to the first electrically heated catalyst is greater than the supply of electric power to the second electrically heated catalyst.

9. An exhaust gas purifying system for an internal combustion engine according to claim 6, wherein the supply of electric power to the first electrically heated catalyst is greater than the supply of electric power to the second electrically heated catalyst.

10. An exhaust gas purify system for an internal combustion engine according to claim 1, wherein the second electrically heated catalyst is energized at the time when the energization of the first electrically heated catalyst has been finished.

11. An exhaust gas purifying system for an internal combustion engine according to claim 10, wherein the supply of electric power to the first electrically heated catalyst is greater than the supply of electric power to the second electrically heated catalyst. electrically heated catalyst.

12. An exhaust gas purifying system for an internal combustion engine comprising:

a three-way catalyst and an adsorbent-catalyst which contains at least zeolite in its composition and is for adsorbing hydrocarbons arranged in this order from upstream in an exhaust gas passage of the internal combustion engine;

a first electrically heated catalyst containing at least platinum in its composition and disposed at the downstream of the adsorbent-catalyst; and a second electrically heated catalyst containing at least palladium in its composition and disposed at the downstream of the first electrically heated catalyst.

* * * * *